United States Patent [19]

Takayama et al.

[11] Patent Number: 6,134,066

[45] Date of Patent: Oct. 17, 2000

[54] RECORDING AND REPRODUCING APPARATUS USING TAPE CASSETTE FOR UPDATING ATTRIBUTE INFORMATION IN WRITE PROTECT MODE

[75] Inventors: Yoshihisa Takayama; Takao Hiramoto, both of Kanagawa; Satoshi Oota, Chiba, all of Japan

[73] Assignee: Sony Corporation, Tokyo, Japan

[21] Appl. No.: 09/045,492

[22] Filed: Mar. 20, 1998

[30] Foreign Application Priority Data

Mar. 21, 1997 [JP] Japan .................................. 9-068511

[51] Int. Cl.[7] .................................................. G11B 15/04
[52] U.S. Cl. ............................................................ 360/60
[58] Field of Search .................................. 360/60, 48, 128, 360/134

[56] References Cited

U.S. PATENT DOCUMENTS 5,493,455  2/1996  Miyoshi et al. ........................... 360/60
5,852,534  12/1998  Ozue et al. ............................. 360/134
5,907,444  5/1999  Oguro ..................................... 360/60

Primary Examiner—W. Chris Kim
Attorney, Agent, or Firm—Frommer Lawrence & Haug, LLP.; William S. Frommer; Dexter T. Chang

[57] ABSTRACT

A recording and reproducing apparatus using a cassette, which is capable of being set to a write-protect mode for a stored recording medium, includes a head for recording data inputted from an outside of the apparatus in the recording medium and reproducing data recorded in the recording medium; a detector for detecting whether the cassette is set to a record-possible mode or the write-protect mode; and a controller for controlling the apparatus so as to record input data from the outside of the apparatus and attribute information of the recording medium in the recording medium when the cassette is set to the record-possible mode and record the attribute information but not the input data in the recording medium when the cassette is set to the write-protect mode.

10 Claims, 7 Drawing Sheets

RECORDING AND REPRODUCING APPARATUS USING TAPE CASSETTE FOR UPDATING ATTRIBUTE INFORMATION IN WRITE PROTECT MODE

BACKGROUND OF THE INVENTION

1. Field of the Invention

The present invention relates to a magnetic recording and reproducing apparatus with a built-in head cleaning device. More specifically, in a magnetic recording and reproducing apparatus using a tape cassette having a write-protect function for inhibiting data from being re-written, when a magnetic head is cleaned, a head cleaning is implemented based on attribute information which is not related to original data in record information and this attribute information can be re-written regardless of a write-protect mode, whereby a correct head cleaning can be executed only by the attribute information.

2. Description of the Related Art

In a tape cassette (tape streamer) used in order to save computer data, most of magnetic recording and reproducing apparatus include magnetic head cleaning device for enabling data to be correctly recorded and reproduced (written and read out).

A head cleaning should be executed at a proper timing. If the head cleaning is executed too frequently, then the head will be worn easily, and a life span of head will be shortened. If the number of the head cleaning is reduced too much, then the head will be smudged. There is then the risk that data cannot be recorded and reproduced correctly. When a head cleaning is not executed properly, it is considered that this will exert an adverse effect upon a life span of a plunger which operates a cleaning roller for cleaning a magnetic head.

Therefore, a head cleaning processing should be executed at a proper timing. It is customary that a magnetic head is smudged depending upon a condition of a cassette tape used. The reason is that a tape itself is progressively damaged as the number in which the tape is loaded onto the apparatus increases, thereby resulting in the magnetic head being smudged increasingly.

Similarly, the number in which data is overwritten and the frequency in which an error occurs (error log) are considered as factors for determining whether or not a head is smudged. For example, when a frequency at which an error occurs is large, it is considered that a head is smudged accordingly.

Therefore, a head cleaning timing should be determined considering a condition under which a tape is in use. As a typical example of factors for determining the condition under which the tape is in use, there are enumerated the number of the tape loading, the number of the overwriting and the number of errors (these factors will hereinafter be collectively referred to as system log).

Contents of system log are generally saved together with original data in the tape as attribute data (attribute information). The system log can be recorded on a system log area provided in a data format which records data. Thus, when a tape cassette is loaded onto an apparatus, it is possible to calculate a frequency at which a tape is in use with reference to the system log area.

There are tape cassettes of the structure incorporating an auxiliary memory means, for example, a one with a built-in memory means using a non-volatile semiconductor memory (memory-in-cassette (MIC): details thereof will be described later on). In case of such tape cassette incorporating the memory, contents of system log can be recorded not in a tape but in this memory.

There are tape cassettes having a so-called write-protect function which inhibits recorded data from being erased. When the tape cassette is placed in the write-protect state, data can be read out but data cannot be re-written (re-recorded). Attribute information also cannot be re-recorded. This is also true in the MIC cassette.

Considering the way the cassette is used, when the tape cassette is in use, the recording of data is not always executed.

It is frequently observed that data is only read out and only the read-out data is used. This is also true in the tape cassette of which the write-protect mode is operated.

When the tape cassette, which is placed in the write-protect mode, is in use, even if the number of the loading increases, the contents of the system log are the same and not changed. The log data are those obtained before the tape cassette is placed in the write-protect mode. However, it is considered that, when the tape cassette is loaded on the magnetic recording and reproducing apparatus and data is read out from the tape, the tape is smudged frequently. Therefore, the number of the loading presented when the tape cassette is placed in the write-protect mode should be used as head cleaning determining information.

In the case of the tape which is set to the write-protect mode, even though the head cleaning should be executed at the stage the write-protect is released, it is frequently observed that the head cleaning time has already been missed at that time.

SUMMARY OF THE INVENTION

The present invention can solve the aforementioned problem encountered with the prior art, and intends to propose a magnetic recording and reproducing apparatus in which at least only the system log information, which is the attribute information, can be re-recorded even though the write-protect mode is activated and in which a head cleaning can be executed at a proper timing by using this system log information.

In order to solve the above-mentioned problem, according to the present invention, there is provided a recording and reproducing apparatus using a cassette which enables to set a write-protect mode for stored recording medium comprising: a recording/reproducing means having a head for recording data inputted from an outside of the apparatus in the recording medium or reproducing data recorded in the recording medium; a detecting means for detecting whether the cassette is set to a record-possible mode or a write-protect mode; and a control means for controlling the recording/reproducing means so as to record an input data from the outside of apparatus and an attribute information of the recording medium in the recording medium when the cassette is set to the record-possible mode and record the attribute information but not the input data in the recording medium when the cassette is set to the write-protect mode.

According to this invention, regardless of whether the write-protect is activated or not, attribute information (especially, system log information) can be read and written. Thus, even when the write-protect mode is activated (even when the write-protect notch is set to the write-protect side), the attribute information can be updated in response to the number of the loading and the number in which an error (reproduction error) occurs. Then, this updated attribute information can be re-recorded on the tape cassette.

Thus, since the system log information is updated at each time even though the write-protect is activated, of the system log information, the number in which the tape cassette is loaded in actual practice is reflected on the number of the loading.

Therefore, even though the head cleaning timing is determined based on the system log information, this cleaning processing can be executed properly. That is, the cleaning processing can be executed at a proper timing.

In order that the attribute information may be updated even in such write-protect mode, an MIC cassette should preferably be used as a tape cassette. The reason for this is that data can be easily re-written in a built-in memory independently of a tape recording and reproducing processing.

BRIEF DESCRIPTION OF THE DRAWINGS

These and other objects of the present invention will be made clear from the drawings and the detailed description to be given below.

DESCRIPTION OF THE PREFERRED EMBODIMENT

Subsequently, the manner in which a magnetic recording and reproducing apparatus according to this invention is applied to a magnetic recording and reproducing apparatus for a tape streamer including a head cleaning device will be described in detail with reference to the drawings.

Figure 1:
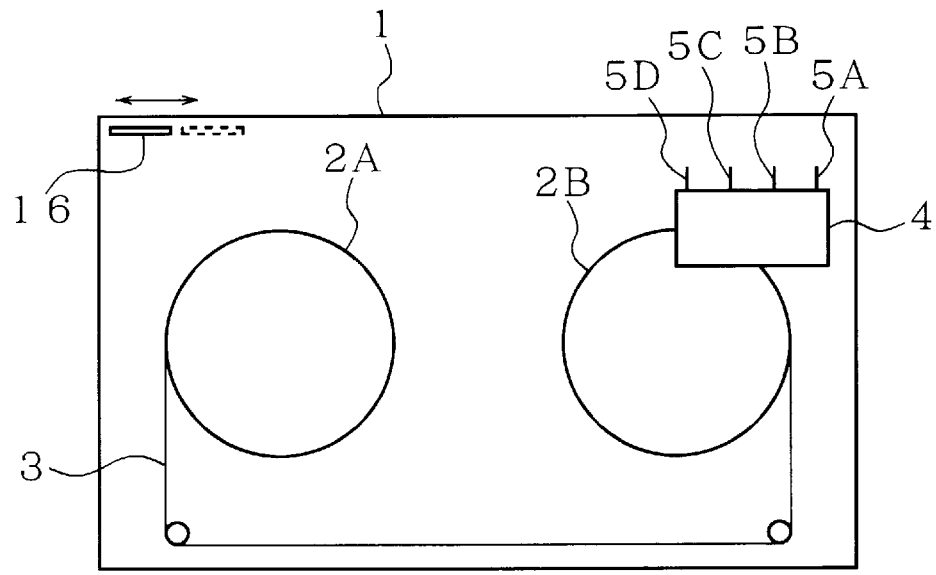
FIG. 1 is a plan view of a cassette with a semiconductor memory (MIC)

FIG. 1 is a conceptual diagram showing an inside structure of a tape cassette which is applicable to this invention. Reels 2A and 2B are disposed within a tape cassette 1 shown in the sheet of drawing, and a magnetic tape 3 having a tape width of 8 mm is wound between the reels 2A and 2B.

The tape cassette 1 shown in FIG. 1 is provided with an MIC 4 which is a non-volatile memory that can function as an auxiliary memory means as described above. From the module of this MIC 4 are led out a power supply terminal 5A, a data input terminal 5B, a clock input terminal 5C and a ground terminal 5D, etc. In the MIC 4 are memorized year, month, day at which each tape cassette is manufactured, a place in which each tape cassette is manufactured, a thickness and a length of a tape, a material, use history information of a magnetic tape, management information of recorded data, user information or the like.

For example, management information such as recorded data of every partition is written in a start position of a partition on a magnetic tape, for example, in an ordinary tape streamer drive system. The streaming tape drive accesses management information of a start position of a partition, and then goes to a recording/reproducing operation.

A variety of attribute information indicative of the use condition of the cassette 1 is memorized in this MIC 4 as will be described later on. The attribute information is used for determining a head cleaning timing.

Figure 2:
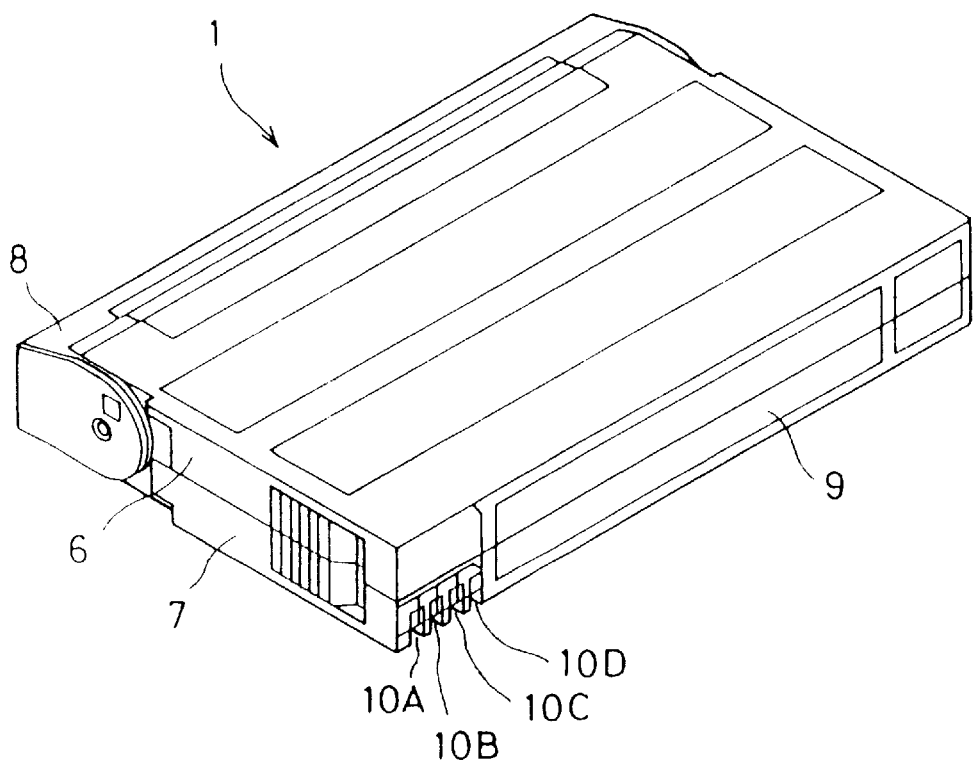
FIG. 2 is a perspective view of the cassette with the MIC.

FIG. 2 shows an example of an appearance of the tape cassette 1. A housing comprises an upper case 6, a lower case 7 and a guard panel 8, and an arrangement thereof is fundamentally similar to that of a tape cassette for use with an ordinary 8-mm VTR. On a label surface of the side wall of this tape cassette 1 are disposed terminal pins 10A, 10B, 10C, 10D which are connected to the power supply terminal 5A, the data input terminal 5B, the clock input terminal 5C and the ground terminal 5D of the above-mentioned MIC 4, respectively.

A write-protect notch 16 is attached on the back surface of the opposite side of the MIC 4 wherein the notch 16 can slide freely. The write-protect mode can be set or released by sliding this notch 16.

Figure 3:
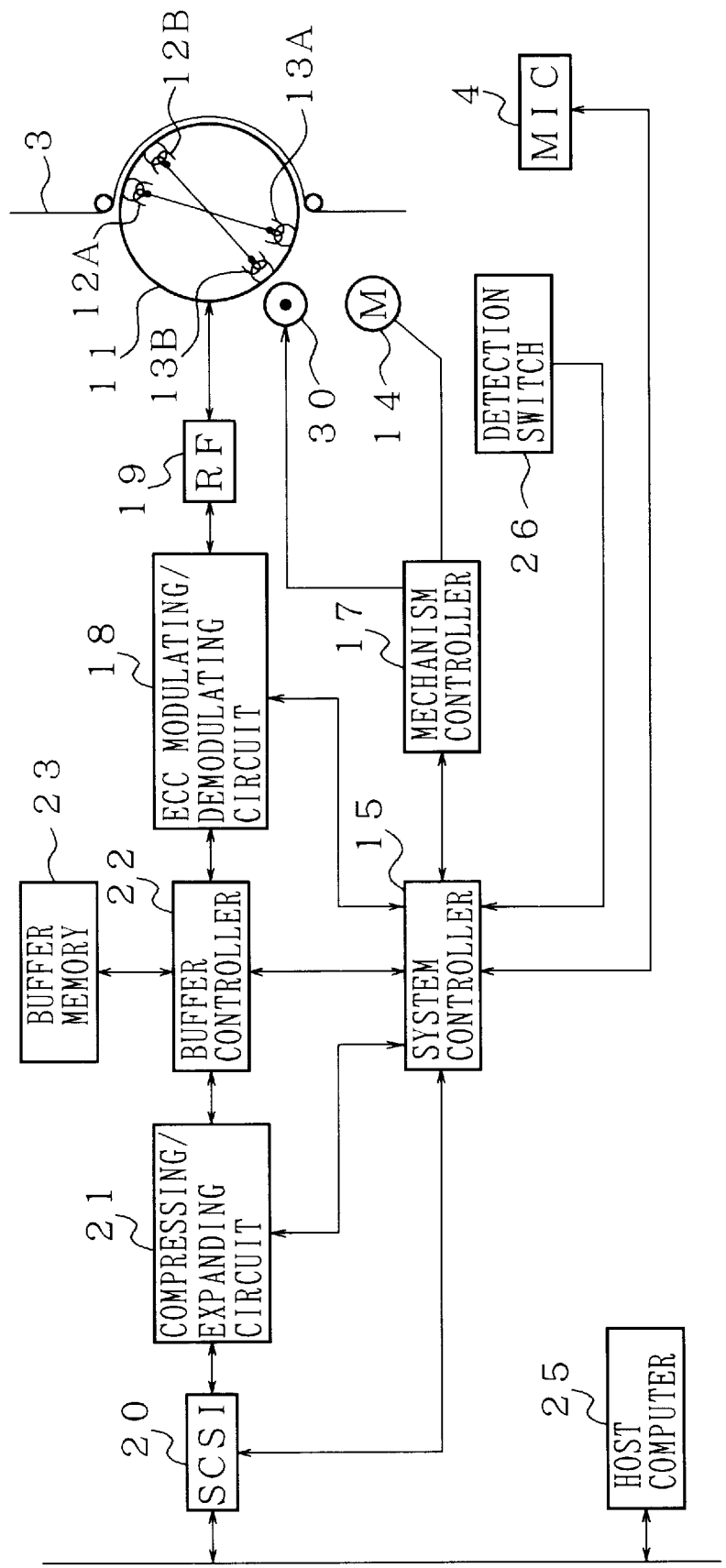
FIG. 3 is a block diagram showing an example of a recording and reproducing processing system.

A streaming tape drive shown in FIG. 3 is able to record/reproduce a magnetic tape by using a tape cassette having a tape width of 8 mm according to the helical-scan system.

As illustrated, a rotary drum 11 has mounted thereon two recording heads 12A, 12B and two reproducing heads 13A, 13B, for example. The recording heads 12A, 12B are of the structure such that two gaps having different azimuth angles are disposed close to each other. Similarly, the reproducing heads 13A and 13B are of the structure such that two gaps having different azimuth angles are disposed close to each other.

The rotary drum 11 is rotated by a drum motor 14 and a magnetic tape 3 unreeled from the tape cassette 1 is rolled round the drum 11. The drum motor 14 is driven under control of a mechanism controller 17. The mechanism controller 17 servo-controls and tracking-controls the drum motor 14, and is connected to a system controller 15 which executes a control processing of the whole system in a two-way fashion. Facing to the rotary drum 11, the recording heads 12A, 12B and reproducing heads 13A, 13B (described later) are disposed.

This tape streamer drive apparatus uses a SCSI interface to input/output data. When data is recorded, for example, data is successively inputted at a transmission data unit of a fixed length record (record), which will be described later on, from a host computer 25 through a SCSI interface 20, and supplied to a compressing/expanding circuit 121.

The compressing/expanding circuit 21 compresses inputted data according to a predetermined system, if necessary. If a compression system based on an LZ code, for example, is adopted as an example of the compression system, then special codes are allotted to character strings that have been processed according to this system, and stored in the form of a dictionary. Then, character strings which will be inputted and the contents of the dictionary are compared with each other. If the character string of the inputted data agrees with the code of the dictionary, then this character string data is replaced with the code of the dictionary. Data of the inputted character string which does not agree with the dictionary is successively given new codes and registered in the dictionary. In this manner, data of the inputted character string is registered in the dictionary and the character string data is replaced with the code of the dictionary, thereby the data compression is carried out.

At the stage data is supplied from the host computer 25, if image data or the like, for example, has already been compressed, then the image data need not be compressed by the compressing/expanding circuit 21. In this case, inputted data is not compressed by the compressing/expanding circuit 21 and outputted as it is. A user, for example, can determine in advance whether or not this compression processing should be executed. It is determined by the system controller 15 on the basis of the data inputted thereto through the SCSI interface 20 whether or not the compression processing should be executed.

An output from the compressing/expanding circuit 21 is supplied to a buffer controller 22, and the buffer controller 22 temporarily stores the output of the compressing/expanding circuit 21 in a buffer memory 23 by its control operation. The data stored in the buffer memory 23 is converted into data of group (Group) of a fixed length unit corresponding to 40 tracks of a magnetic track under control of the buffer controller 22, as will be described later on finally. This data is supplied to an ECC•modulating/demodulating circuit 18.

The ECC•modulating/demodulating circuit 18 adds an error-correction code to the inputted data, modulates the inputted data into data suitable for magnetic recording, and supplies the data thus modulated to an RF amplifier 19. A recording signal amplified by the RF amplifier 19 is supplied to the recording heads 12A, 12B, whereby data is recorded on the magnetic tape 3.

A data reproducing operation will be described in brief. Recorded data is read out from the magnetic tape 3 by the reproducing heads 13A, 13B as RF reproduced signal. The reproduced output is supplied through the RF amplifier 19 to the ECC•modulating/demodulating circuit 18, in which it is demodulated and then error-corrected. A demodulated output from the ECC•modulating/demodulating circuit 18 is temporarily stored in the buffer memory under control of the buffer controller 22, and then supplied to the compressing/expanding circuit 21.

The compressing/expanding circuit 21 expands data if it is determined by the system controller 15 that the data is data compressed by the compressing/expanding circuit 21 upon recording. If the data is not data which is compressed, then the compressing/expanding circuit does not expand data and outputs the same as it is.

Data outputted from the compressing/expanding circuit 21 is outputted through the SCSI interface 20 to the host computer 25 as reproduced data. Corresponding to the notch 16, a detection switch 26 is given for detecting whether the tape cassette 1 is in a recording condition or not.

The MIC 4 and the magnetic tape 3 of the tape cassette are shown in the figure. When the tape cassette body is loaded onto the tape streamer drive, the MIC 4 is connected through the terminal pins shown in FIG. 1 to the system controller 15 in such a manner that data can be inputted and outputted between it and the system controller. Information is mutually transmitted between the MIC 4 and the external host computer 25 by using SCSI commands. Therefore, a special line need not be laid between the MIC 4 and the host computer 25 with the result that data can be exchanged between the tape cassette and the host computer 25 only through the SCSI interface. Here, it can be considered that the signal transmitting system between the MIC 4 and system controller 15 might be a radio transmitting system utilizing a light or an electromagnetic wave.

Figure 4:
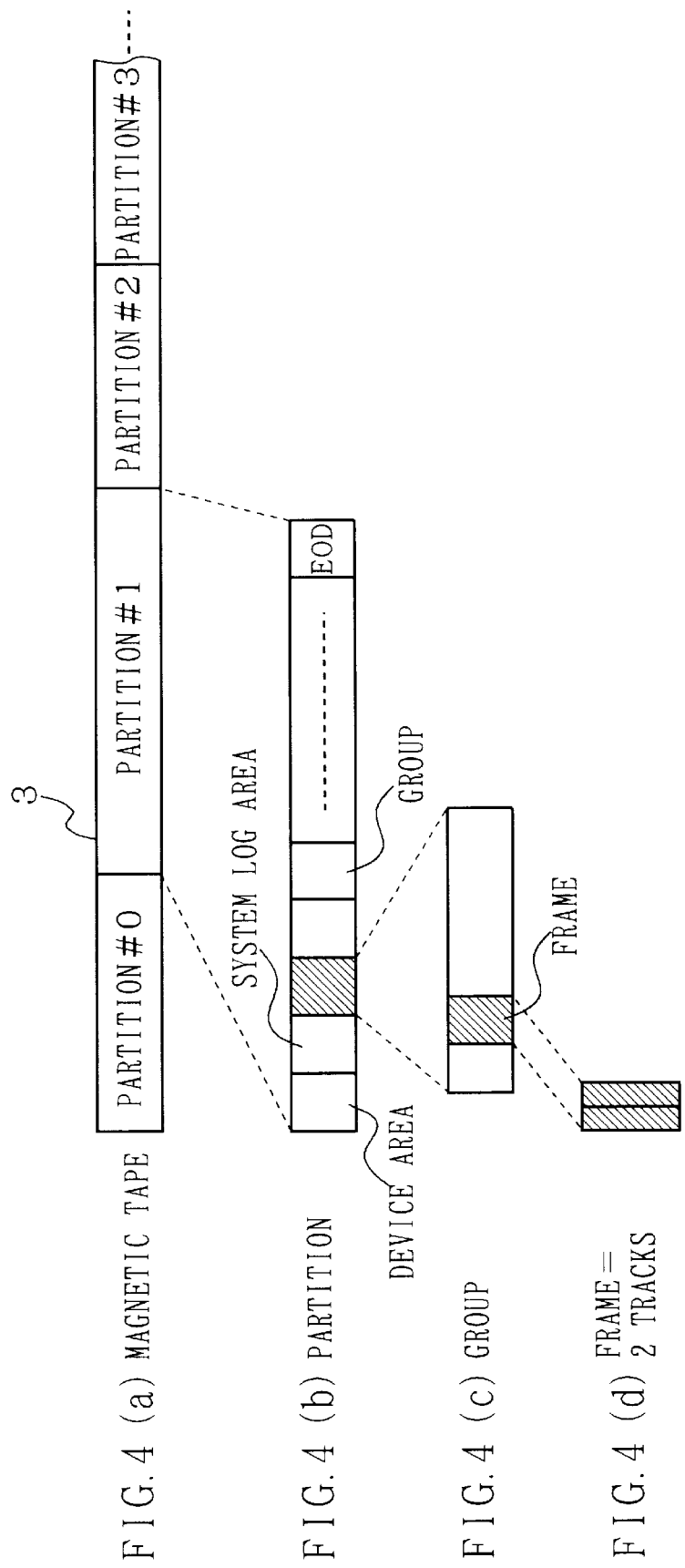
FIG. 4 is a diagram of a format.

FIG. 4 shows an example of a data format recorded on the magnetic tape 3. As shown at (a) in the figure, one magnetic tape 3 is divided at the unit of a partition, and 256 partitions, for example, can be set and managed at maximum. Partitions are numbered as management numbers (partitions #0, #1, #2, #3, . . . ), and data can be independently recorded/reproduced in and from each partition. A data recording unit within one partition shown in FIG. 4(b) can be divided into a fixed length unit which is referred to as a group shown in FIG. 4(c). A recording on the magnetic tape 3 is effected at the unit of this group.

In this case, one group corresponds to a data amount of 20 frames, and one frame is comprised of 2 tracks as shown in FIG. 4(d). One group is comprised of 40 tracks accordingly.

System log information indicative of static history of every partition is managed at every partition. As shown in FIG. 4(b), a device area and a system log area are respectively provided ahead of the first group composing the partition, and system log information indicative of static history such as the number in which the partition is read out, error log and the number in which data is rewritten is updated in this system log area each time data is read and written. To the end of the partition is inserted an EOD which indicates the end of the partition. Meantime, the data structure shown in FIG. 4 is minutely described in U.S. patent application Ser. (No. 08/776,646 filed Feb. 2, 1997) previously filed by the present applicant.

Subsequently, the case in which the embodiment according to this invention is applied to a data streamer for recording back-up data will be described.

Figure 5:
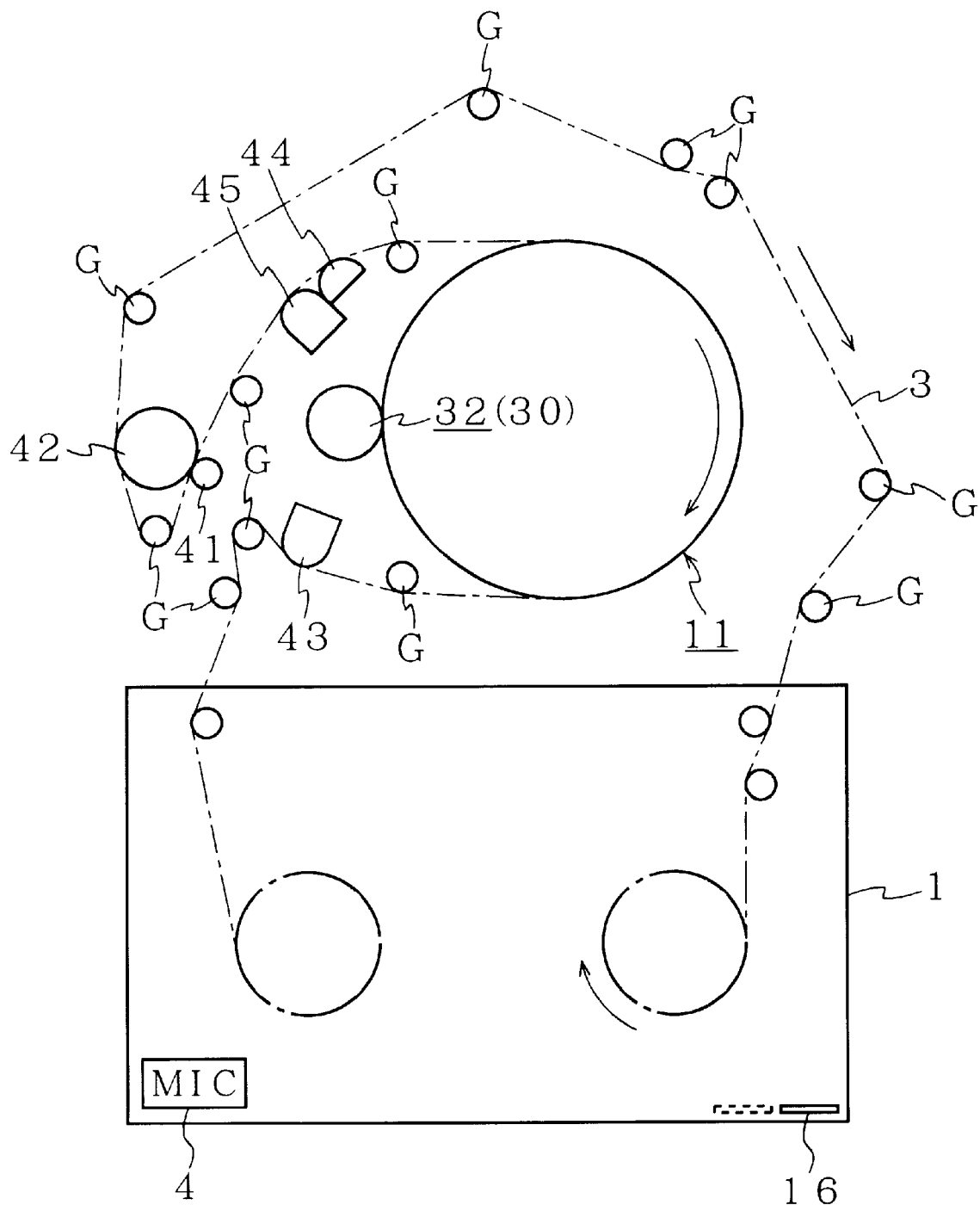
FIG. 5 is a plan view of a main portion of a tape streamer housing a head cleaning device to which a magnetic recording and reproducing apparatus according to this invention is applied.

FIG. 5 shows a relationship established between a tape transport system and a rotary drum when said streaming tape drive 100 is provided with a tape cleaning mechanism. The magnetic tape 3 is wrapped around the rotary drum 11 with an angular spacing of substantially 180°. As a result, the magnetic tape 3 unreeled from the cassette 1 is wound around the rotary drum 11 through a plurality of fixed or movable tape guides G in substantially U-shape.

An erase head 43 of a full width is disposed at the tape entrance side relative to the rotary drum 11, and an erase head 44 for control tracks and a recording and reproducing head 45 for audio data and the like are disposed at the tape exist side. The magnetic tape 3 is transported by the capstan 41 and the pinch roller 42 as shown by an arrow.

A head cleaning device 30 is provided at the position in such a manner that it may not disturb the magnetic tape 3 wrapped around the rotary drum in a U-shape from running. The head cleaning device 30 includes a cleaning roller 32 as shown in FIG. 6, and the cleaning roller is pressed into contact with and away from the rotary head mounted on the rotary drum 11.

Figure 6:
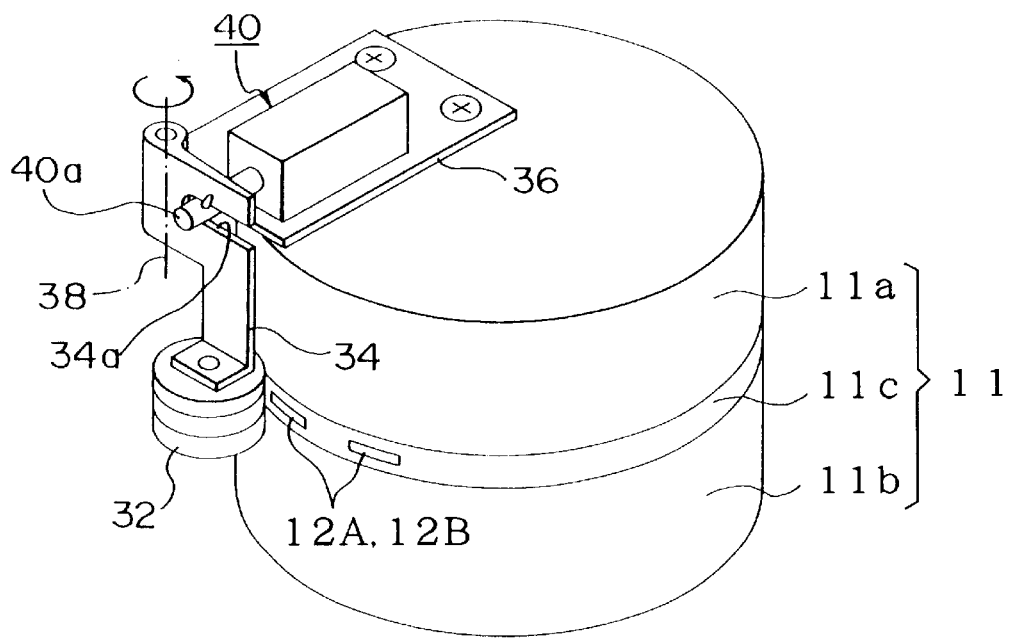
FIG. 6 is a conceptual diagram of a head cleaning device.

FIG. 6 shows a relationship between the rotary drum 11 and the head cleaning device 30. The rotary drum 11 includes fixed upper drum 11a, fixed lower drum 11b and a rotary cylinder 11c disposed between the upper and lower drums. This rotary cylinder 11c has a plurality of rotary heads shown in FIG. 3 attached thereto. Erase heads are disposed at adjacent positions advanced from the recording head, respectively.

Figure 7:
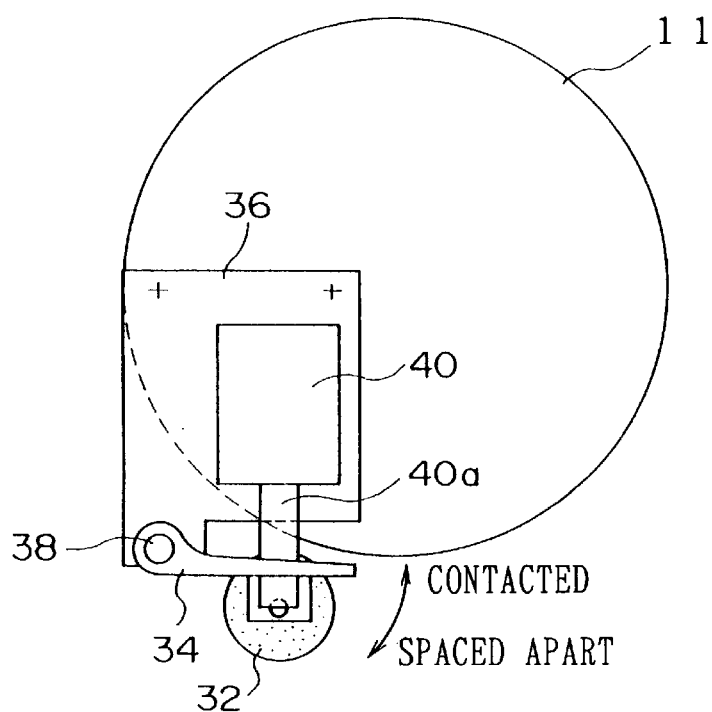
FIG. 7 is a plan view of the head cleaning device.

As shown in FIGS. 6 and 7, the head cleaning device 30 includes the cleaning roller 32. This cleaning roller is spaced apart from the rotary cylinder 11c by a predetermined distance (about 1 to 3 mm) in such a manner that it can be rotated freely. The cleaning roller 32 is attached to a shift lever 34, and the shift lever 34 is pivotally attached to an axis 38 of a base plate 35 secured to the upper drum 11a.

The shift lever 34 has an upper recess 34a into which a piston 40a of a plunger 40 is inserted. When the plunger 40 is spring-biased, the shift lever 34 is rotated to press the cleaning roller 32 against the circumferential surface of the rotary cylinder 11c. Since the shift lever 34 includes a spring (not shown) to spring-bias the cleaning roller 32 in the direction from which the cleaning roller is spaced apart. Thus, when the plunger 40 is released from being spring-biased, the cleaning roller 32 is returned to the original position.

The attribute information memorized in the MIC 4 is latched in the controller 15 and the cleaning device 30 is controlled based on the control program stored in the memory located inside the controller 15.

As attribute information concerning the cassette 1, there are enumerated the number of the groups written immediately before the loading is executed as mentioned above, the number of groups written at the present time point, the number of the loading (the number of partition used), the number of the overwriting (the number in which the partition is written), ID number, error log (the number of rewritten frames and the number in which ECC is operated), etc.

Among the above-mentioned information, at least the number of the loading, the number of the overwriting, error data, and the like are enumerated as data that can be used as an information to determine whether the head should be cleaned or not. The number of the loading is substantially proportional to the number in which the tape is read and written, and the number of the overwriting is substantially proportional to the number of the writing. Moreover, the error data indicates that the head does not read and write data. It is possible for the user to understand a proper head cleaning timing (time) by using these system log data. In addition to the cleaning time, the user is able to determine how many times the cleaning should be executed continuously or intermittently.

If the write-protect notch 16 is set to the write-protect side when the cassette I includes this notch 16, then the cassette is placed in the write-protect mode. However, the recorded data can be read out even in the write-protect mode. As a result, tape cleaning is carried out since the head has become dirty just like when it is recording. In this case, the system log data on the tape would be necessary to be updated even if the cassette 1 is in the write-protect mode. Otherwise, the number of the loading is not reflected on the data precisely, and the user cannot determine the tape cleaning timing properly.

Therefore, according to this invention, the system log data used as the attribute information can be updated even if the cassette is in the write-protect mode.

Figure 8:
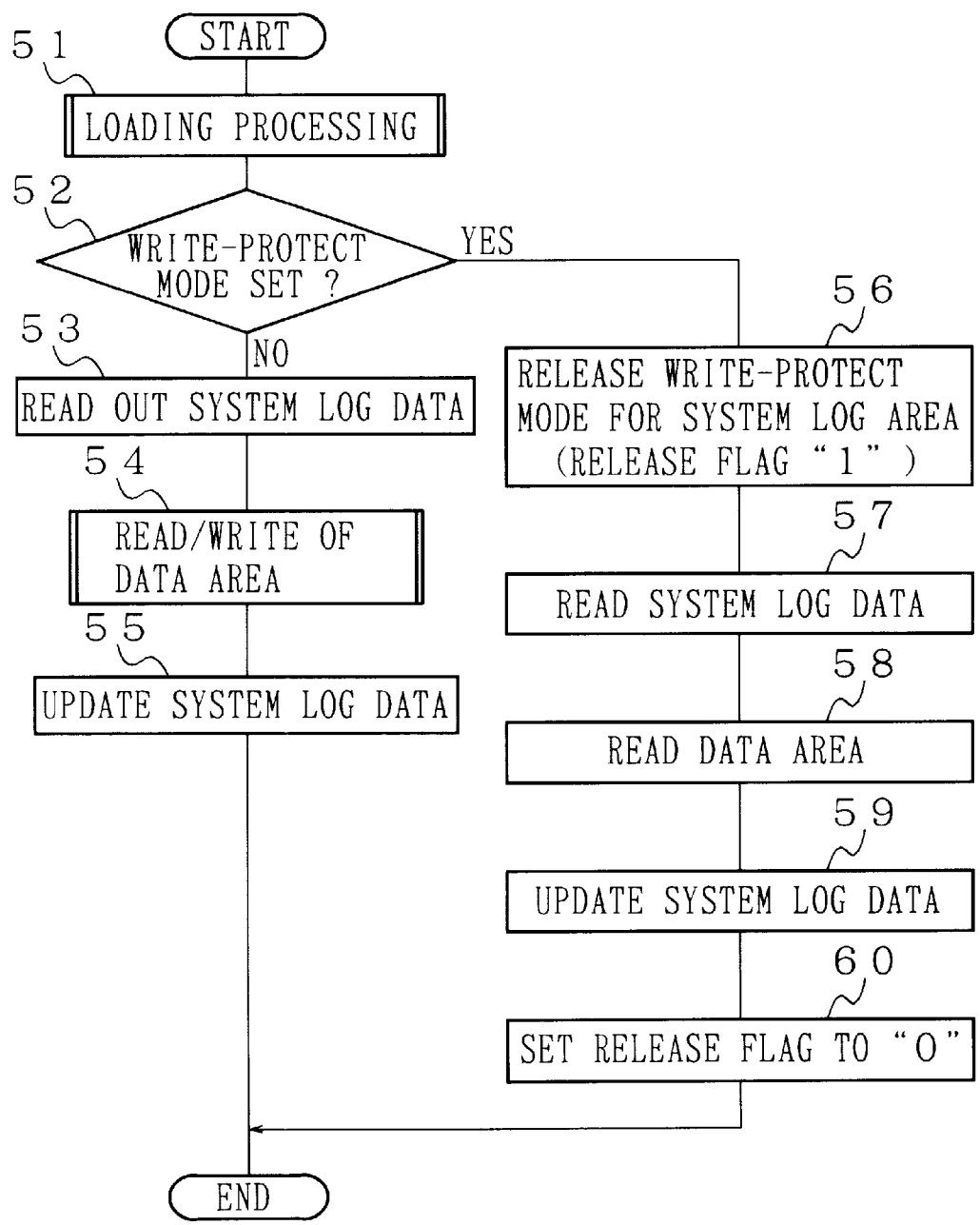
FIG. 8 is a flowchart showing an example in which system log data is updated by using a cassette having no MIC provided therein.

FIG. 8 shows a processing example of the controller 15 in the case in which the present invention is applied to the cassette 1 that does not incorporate the MIC 4 therein. When the controller 15 detects that the cassette 1 has been set onto the apparatus, then the tape is loaded into the apparatus and a tape path shown in FIG. 5 is formed (step 51). Then, the controller 15 determines whether the detection switch 26 is on or off, so that the presence of write-protect mode is checked. If the protect in which the corresponding notch 16 is located at the original position is disabled (step 52), then system log data is read out (step 53) and stored in the memory inside the controller 15.

Subsequently, the drive 100 is placed in the data recording and reproducing mode and data is read and written according to the command sent from the host computer 25 (step 54). When the reading/writing of data is finished, the controller 15 updates (re-records) the system log data such as the number of the overwriting upon read/write mode, contents of error log in the presence of the error and the number of the loading, etc. are updated within the corresponding partition and then a series of processing is ended (step 55). Thereafter, the tape is unloaded and the cassette is ejected.

If the cassette 1 is set to the write-protect mode (step 52), then the write-protect mode for the system log area on the tape is released initially (step 56). This processing is a software processing, and hence need not be described in detail. By the mode releasing processing, a release flag is set to "1".

After this release processing, the controller 15 reads out the system log data and stores the data in the memory inside the controller 15 (step 57). Then the data is reproduced from the data area according to the transition to a tape reproducing mode (step 58). Since releasing of the write-protect mode is effected only for the system log area, the controller 15 cannot move to the tape recording mode. Hence, no data is recorded in the data area.

At the completion of the data read mode, since the number of the loading stored in the controller 15 is updated, the controller 15 performs the data update (system log data update) within the corresponding partition (step 59). This processing is a rewrite processing within the system log area on the tape. When this rewrite processing is ended, the release flag is reset to "0" (step 60), and a series of processing is finished.

The system log data can be updated by partly releasing the write-protect mode in a software fashion.

Figure 9:
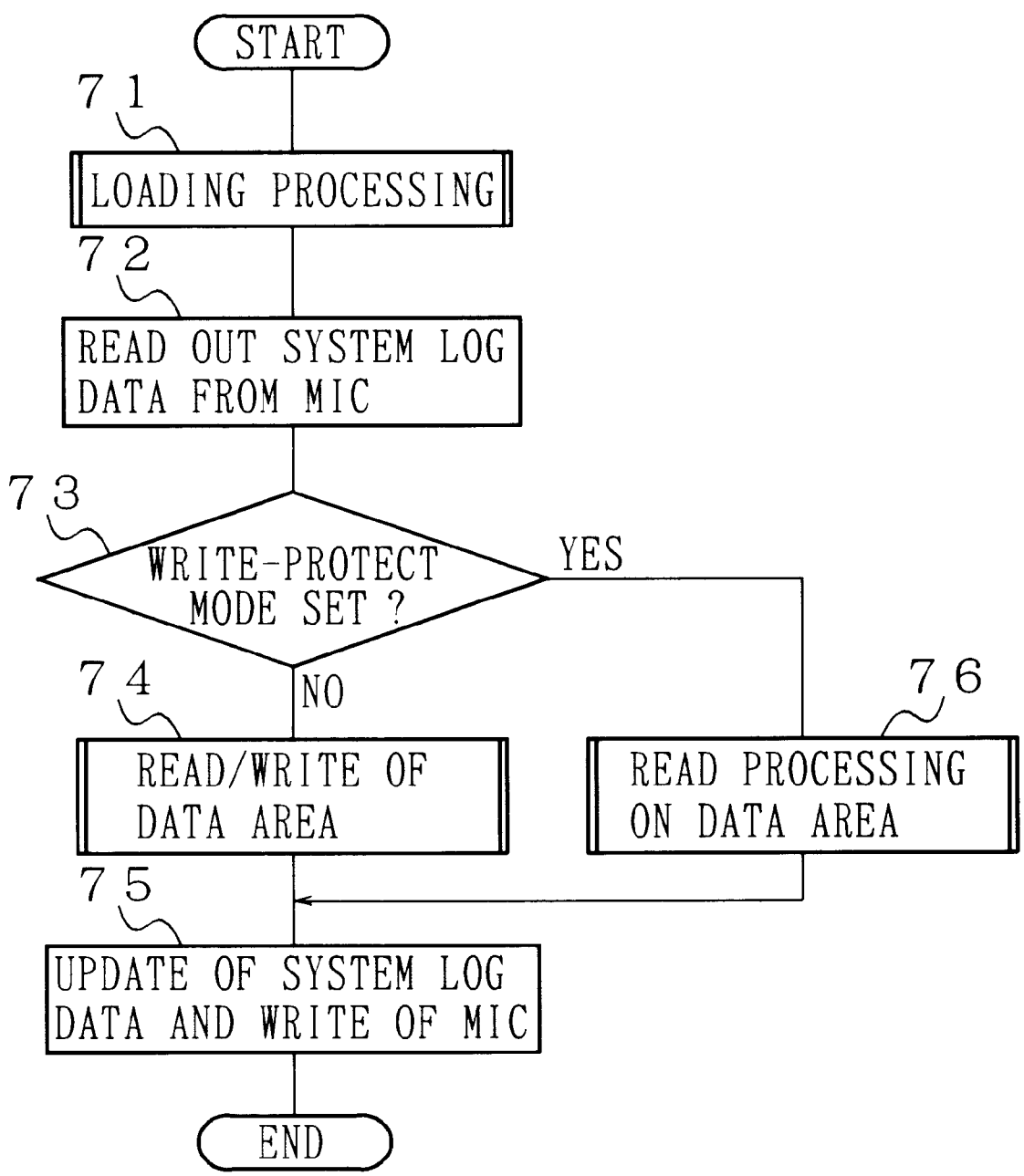
FIG. 9 is a flowchart showing an example in which system log data is updated by using a cassette having an MIC provided therein.

FIG. 9 shows a processing example of the controller 15 in which the cassette 1 with the MIC is loaded onto the apparatus. When the loading processing for the magnetic tape 3 is ended, system log data is immediately read out from the MIC 4 (steps 71, 72). This data is transmitted to the controller 15 side.

Then, the state of the notch 16 is discriminated. If it is discriminated that the write-protect mode has been released (step 73), then, in the same manner of ordinary operation mode, the read/write processing is effected on the data area according to the command from the host computer 25. At the same time, corresponding partition's system log data is updated in response to the number of the overwriting and the error processing (steps 47, 75). Since this update is executed when the cassette 1 is ejected, the system log data is temporarily saved in a memory within the controller 15 until then.

On the other hand, when the cassette 1 is in the write-protect mode (step 73), the controller 15 controls the entire apparatus so as to enable to perform only the read processing for the data area (step 76). Then, the controller 15 monitors which partition's data has been read out and its information is stored in the memory within the controller 15. Then, when the cassette 1 is ejected, the number of the reading and the system log data (the number of the loading) within the MIC 4 are updated by accessing the MIC 4 (step 75).

With respect to a head cleaning timing, a head cleaning can be executed during a tape rewind operation, for example. A proper cleaning period lies in a range of from about 0.1 to 0.2 second.

The attribute information used when the head cleaning is executed is not limited to the above-mentioned system log data, and the cleaning roller can be operated by using also symbol error rate information indicative of whether or not data of that track can be read out together with the system log data.

Even when the write-protect mode is set, according to the present invention, the write-protect mode for the system log area is released temporarily. Thus, when the system log data contains contents to be updated, such data can be updated.

Therefore, even when the cassette with the write-protect operated is in use, its data becomes data in which the cassette use state is accurately reflected. Thus, if this system log data is used, then the head cleaning timing can be determined correctly.

As a result, since it becomes possible to execute the head cleaning at a proper timing, the error rate can be reduced, and a durability of head can be improved considerably. Therefore, the present invention is very suitably applicable to the tape streamer apparatus in which the occurrence of data error can be avoided as much as possible.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A recording and reproducing apparatus using a cassette, which is capable of being set to a write-protect mode for a stored recording medium, comprising:

recording/reproducing means having a head for recording data inputted from an outside of the apparatus in said recording medium and reproducing data recorded in said recording medium;

detecting means for detecting whether said cassette is set to a record-possible mode or the write-protect mode; and control means for controlling said recording/reproducing means so as to record input data from the outside of the apparatus and attribute information of said recording medium in said recording medium when said cassette is set to the record-possible mode and to record said attribute information but not said input data in said recording medium when said cassette is set to the write-protect mode.

2. A recording and reproducing apparatus according to claim 1, further including means for cleaning said head and wherein said control means determines a timing to clean said head based on said attribute information.

3. A recording and reproducing apparatus according to claim 1, wherein said attribute information is system log data which includes at least one of the following: a number of said recording medium being loaded into the apparatus, a number of data being overwritten to said recording medium, a number of data being reproduced from said recording medium, and a number of error occurred during recording or reproducing operation.

4. A recording and reproducing apparatus according to claim 1, wherein said recording/reproducing means records said attribute information in a system log area other than an area for recording said input data of said recording medium.

5. A recording and reproducing apparatus according to claim 1, wherein said cassette includes a memory IC provided apart from said recording medium and said control means records said attribute information in said memory IC instead of said recording medium.

6. A recording and reproducing apparatus for using a cassette, which stores a tape-type recording medium, includes a memory IC as an auxiliary memory, and is capable of being set to a write-protect mode for said tape-type recording medium, comprising:

recording/reproducing means having a head for recording data inputted from an outside of the apparatus in said tape-type recording medium and reproducing data recorded in said tape-type recording medium;

detecting means for detecting whether said cassette is set to a record-possible mode or the write-protect mode; and control means for controlling so as to store attribute information in the memory IC when said cassette has said memory IC and record said attribute information in a predetermined position of said tape-type recording medium when said cassette does not have said memory IC;

wherein said control means controls said recording/reproducing means so as to record input data from the outside of the apparatus and the attribute information of said tape-type recording medium in said tape-type recording medium when said cassette is set to the record-possible mode and to record said attribute information but not said input data in said tape-type recording medium when said cassette is set to the write-protect mode.

7. A recording and reproducing apparatus according to claim 6, further including a SCSI interface for transmitting data between said memory IC and an external host computer.

8. A recording and reproducing apparatus according to claim 6, further including means for cleaning said head and wherein said control means determines a timing to clean said head based on said attribute information.

9. A recording and reproducing apparatus according to claim 6, wherein said attribute information is system log data which includes at least one of the following: a number of said recording medium being loaded into the apparatus, a number of data being overwritten to said recording medium, a number of data being reproduced from said recording medium, and a number of error occurred during recording or reproducing operation.

10. A recording and reproducing apparatus according to claim 6, further comprising storing moans for storing information, wherein said control means reads out said attribute information from the predetermined position of said tape-type recording medium or said memory IC of the cassette, stores the attribute information in said storing means, and updates said attribute information corresponding to recording operation and reproducing operation of said recording/reproducing means.

* * * * *